(No Model.)

G. SMITH.
NUT LOCK.

No. 553,435. Patented Jan. 21, 1896.

WITNESSES:
M. S. Blondel
Jos. A. Ryan

INVENTOR
Green Smith.
BY Munn & Co.
ATTORNEYS.

UNITED STATES PATENT OFFICE.

GREEN SMITH, OF MONTGOMERY, WEST VIRGINIA.

NUT-LOCK.

SPECIFICATION forming part of Letters Patent No. 553,435, dated January 21, 1896.

Application filed July 30, 1895. Serial No. 557,593. (No model.)

*To all whom it may concern:*

Be it known that I, GREEN SMITH, a citizen of the United States, residing at Montgomery, in the county of Fayette and State of West Virginia, have invented certain new and useful Improvements in Nut-Locks, of which the following specification contains a full, clear, and exact description, reference being had to the accompanying drawings, forming part thereof, in which—

Figure 1:
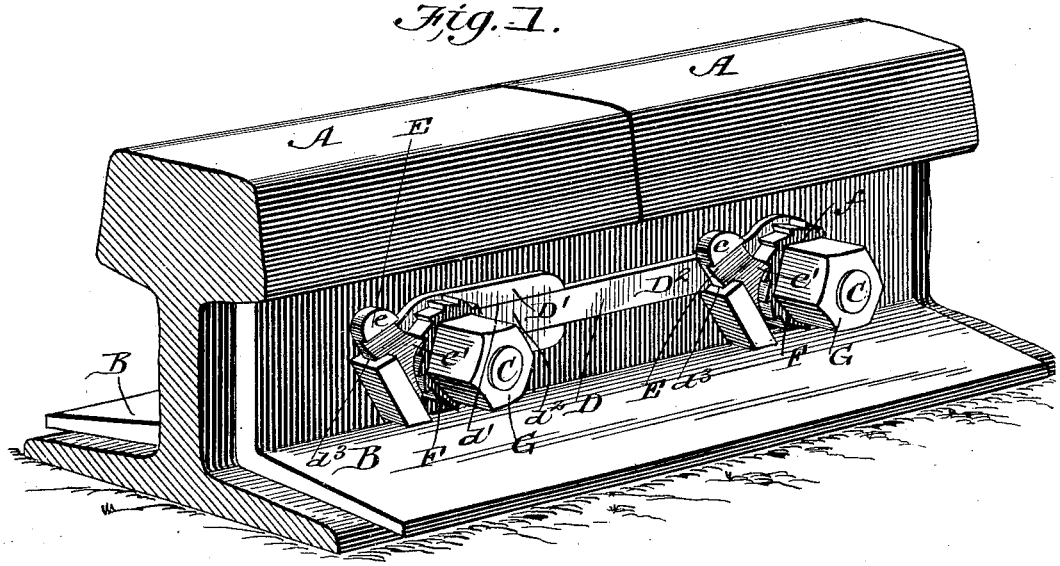
Figure 2:
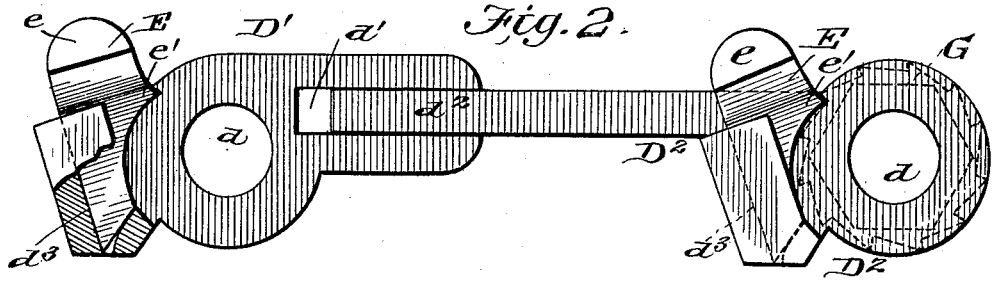
Figure 3:
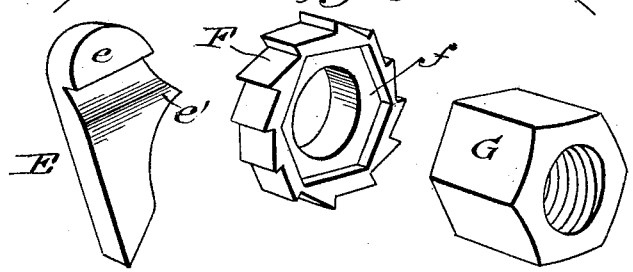

Figure 1 is a perspective showing my nut-lock applied to the bolts which secure the fish-plates to the adjacent ends of two rails. Fig. 2 is a side elevation of the extensible base-plate and the locking-dogs carried thereby. Fig. 3 shows one of the nuts and its washer and locking-dog detached.

The objects of my invention are to provide a simple and effective means for locking nuts in their adjusted position, to construct the base-plate so that it may be extended or adjusted longitudinally to bring its bolt-apertures into alignment with the rail and fish-plate aperture, and to provide a ratchet-washer having a recessed outer face adapted to receive the adjacent face of the nut to be locked.

The invention consists in the construction and arrangement of parts hereinafter described and claimed.

A A are the rail ends. B B are the fish-plates and C C are the bolts connecting them, as usual.

D is the base-plate of my nut-lock and is formed in two sections $D'$ $D^2$, provided in their opposite ends with apertures $d$, which receive the bolts C C and permit the base-plate to rest against the outer side of the fish-plate. In order that the apertures $d$ may register with the fish-plate bolt-holes where they are a greater or less distance apart, I connect the two sections $D'$ $D^2$ extensibly by means of a tongue $d^2$ on the section $D^2$ and a slot $d'$ in the section $D'$, in which slot the tongue is free to slide. Each section $D'$ $D^2$ is provided on its outer face to the left of the bolt-hole $d$ with an inclined socket $d^3$ open at its upper and inner sides and closed at its outer and lower inclined sides to form a slideway for the vertically-sliding locking-dog E, one of which is mounted in each socket. The dog E has a head $e$, by which it may be operated, and the inner face of its upper portion is beveled in opposite directions to form the point or nose $e'$, which engages the ratchet-teeth that turn with the nut.

F represents circular ratchet-washers, which are passed upon the bolts and engaged by the dogs E. The outer faces of the washers F are recessed, as at $f$, to receive the adjacent end of the nuts G, so that when the nuts are screwed upon the bolts the washers will turn with them, and when the nuts are in their proper positions they will be held from rotating in an opposite direction by these washers owing to the fact that the washers are locked by the dogs E and the nuts and washers are locked together. By means of these ratchet-washers having nut-receiving recesses $f$ my nut-lock may be applied to any bolts and nuts now in use on the railroads; but the ratchet-teeth may be formed directly upon the nuts where they are to be supplied with the other parts. It will be seen that as the ratchets F are turned to the right by the nuts the teeth will engage the lower inclined face of the point or nose $e'$ of the locking-dog and raise the dog, which will then drop back by gravity into locking position.

Having thus described my invention, what I claim as new, and desire to secure by Letters Patent, is—

1. A nut lock comprising a base plate formed in two flat apertured sections provided respectively with a longitudinal tongue and a longitudinal slot forming an extensible joint wholly within the plane of the plate; each section being formed on its outer face with an inclined socket open at its upper end and at its side next to the said aperture, and a sliding gravity pawl mounted in each socket and having a nose or point on its edge next to the aperture, substantially as set forth.

2. The combination with the extensible two part base plate having bolt openings at its ends and inclined sockets at one side of said openings, of the sliding dogs mounted in said sockets and having beveled locking noses or points, and the nuts having ratchets engaged by said noses or points substantially as set forth.

GREEN SMITH.

Witnesses:
A. D. SMITH, Jr.,
E. E. BRAGG.